Figure 1:
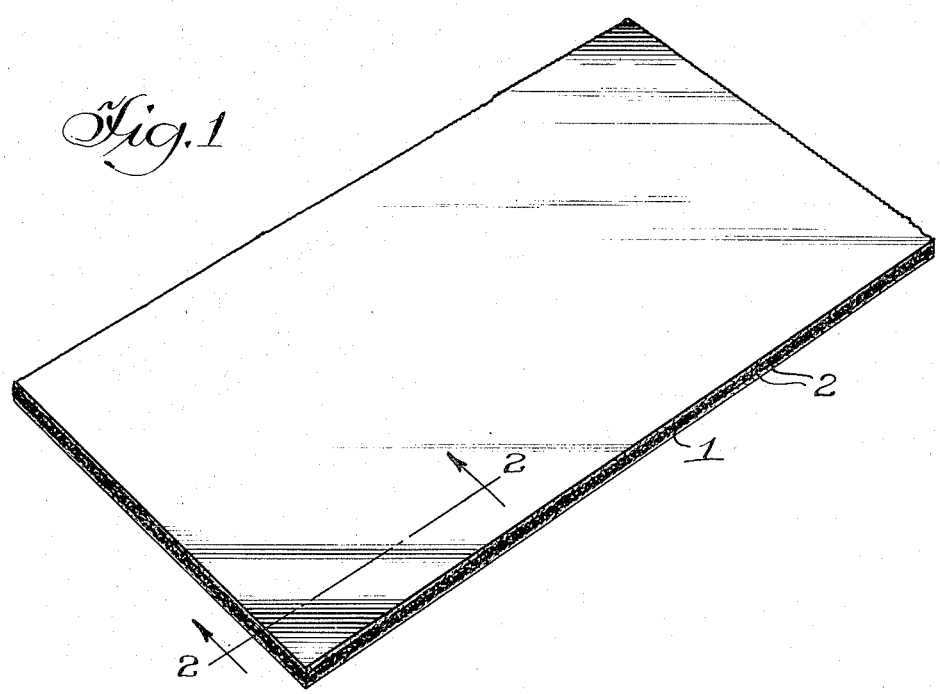

Jan. 5, 1937.  E. C. LOETSCHER  2,067,012
COMPOSITE BUILDING MATERIAL
Filed Oct. 9, 1933

Inventor
Emil C. Loetscher

Patented Jan. 5, 1937

2,067,012

UNITED STATES PATENT OFFICE 2,067,012

COMPOSITE BUILDING MATERIAL

Emil C. Loetscher, Dubuque, Iowa

Application October 9, 1933, Serial No. 692,811

22 Claims. (Cl. 154—45.9)

This invention relates to improvements in composite building material, and more particularly to a homogeneously hard smooth-surfaced product intended for use as a substitute for natural wood for general building purposes, as well as the more finished mill-work products such as doors, panels, mouldings and the like.

The object of the invention is to provide a hard, smooth finished water-resisting material of unusual tensile strength and durability, and otherwise having those properties which make it superior to natural wood or other so-called composition or pressed wood materials for interior as well as exterior wall coverings, trim, doors, panels and like surfaces, ordinarily finished with a coating of varnish, paint or enamel.

In characterizing this material as a novel and superior product, I am well aware of the various kinds of composite building materials and wood substitutes that have been put on the market, ranging from the compressed wood pulp boards having little or no water-resisting properties to the hard infusible products composed of a mixture of wood or other fillers and synthetic resins of the phenol formaldehyde group subjected to heat and pressure. Such products admittedly find many useful purposes, but each falls short of the requirements of a practical commercial substitute for natural wood, either because it lacks the essential qualities of wood or because the high cost of production makes their use prohibitive for general purposes. This is particularly true of the so-called moulded phenol condensation products which contain such a large proportion of synthetic resin as to be too expensive to compete with wood. Moreover, these so-called moulding mixtures do not utilize the natural resins in the wood fillers, relying rather on expensive synthetic resins to give them the required consistency. In fact, natural resins or the use of wood fibers of a highly resinous nature has not been satisfactory, inasmuch as natural resins are relatively unstable at higher than normal temperatures, and consequently flow from the fibers naturally impregnated thereby, to be either lost or deposited as a sticky coating on the surface of the finished product.

The present product on the other hand has the distinct commercial advantage in utilizing a relatively large proportion of the natural resins to be found in many species of coniferous trees and by chemical treatment and the addition of a relatively small proportion of a suitable synthetic resin to produce a product not only having the properties of hardness, density, water and fire-resistance in such measures as make it superior to natural wood as a structural material, but capable of being produced at a cost to compete successfully with natural wood. And moreover, it possesses the property of plasticity to such a degree that while it cannot be moulded to the same extent as the expensive moulding mixtures, it can be formed into shapes unattainable with natural wood outside the realm of the cabinet maker's skill, not to mention many uses for which metal is extensively used.

The merits of the material will best be appreciated from the following discourse in connection with the accompanying drawing, which, it may be observed, is quite inadequate to reveal the real nature and composition of the material, although it will aid in conveying a fairly accurate concept of the structure of the material in its simplest form, namely, a sheet or board.

Figure 2:
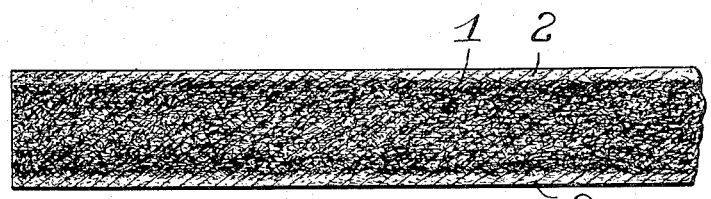

Thus, Figure 1 of the drawing is a perspective view of a small section of the finished material; and Figure 2 is an enlarged view in cross section of the material as taken on line 2—2 of Figure 1.

Considering the product in the form in which it would be most extensively produced commercially, namely, in flat sheets, panels or boards, it would range from $\frac{1}{8}$ of an inch upwardly to almost any thickness desired, although on account of its density, weight and strength, a thickness over $\frac{3}{16}$ or $\frac{1}{4}$ of an inch would ordinarily not be exceeded for general uses.

The material is homogeneous in its composition throughout its entire thickness, that is to say, its structure is uniform throughout as distinguished from a laminated or veneered sheet material, although there may be some variation in the character and composition between the center or body of the material and the surfaces. This variation, however, is largely a matter of color and surface texture rather than substance, so that in using the terms "core" and "layer" it is to be understood that they are used merely to identify the different strata of the material.

Thus the core 1 of the small piece shown in the drawing includes all of the material between the two thin surface layers 2, 2, the former by reason of its composition being somewhat darker in color, ranging from light to a dark brown or rosin shade, while the outer layers are quite light, almost a neutral or sand color, approaching that of white pine. Moreover, the composition of the outer layer is of somewhat finer texture, so that the surface will have a perfectly smooth lustrous finish not unlike a rubbed-down varnished surface. For large commercial production a light natural wood color is preferred, although if desired the material may be produced in any color, shade or decorative finish by the addition of pigments to the composition making up the surface layers.

The base of the material is wood fiber, a substantial portion of which is fiber of a high resin content of which the source is the more common species of coniferous trees such as yellow, white and sugar pines, spruce, larch, tamarack and fir. Moreover, on account of the excessive resinous nature of certain parts of these trees, such as the stumps, those parts are ordinarily discarded or not recovered in lumbering and milling operations, and are, therefore, regarded as waste material. It is this waste material that cannot be converted into merchantable lumber which can be used profitably as the source of the natural resins.

Highly resinous woods, however, have too great an excess of resin to be used solely as the base of the material, and consequently are mixed in a given proportion with a suitable so-called non-resinous wood of the soft or hard varieties, including also cellulose or woody fibers such as occur in bagasse, corn stalks, grasses and the like, this material of a normal resin content having been previously ground or otherwise reduced to a finely divided state. This applies to both the core and the outer surface layers, so that the only real difference between the two is the proportion of normal and excess resin wood fiber that enter into their composition.

Thus the fibrous base for the core or central portion of the material is a mixture of, roughly, ⅔ normal resin wood and ⅓ highly resinous wood fiber, the source of the former being preferably white pine, the waste from milling operations being suitable for this purpose, either in the form of sawdust, wood flour or scraps which are reduced to a finely divided form, as for instance by grinding it to a texture consisting of elongated particles of 1/16 of an inch or less.

Similarly, the highly resinous wood is reduced to a fine fibrous mass, either by grinding or by means of a hammer mill, the wood being preferably fed to the mill in the form of blocks of convenient size, say, 6 inches in length by 4 inches in width and 2 inches in thickness. Manifestly, the two grades of raw fibrous materials are prepared separately to be subsequently mixed and treated according to the general process now to be discussed.

The mixing and treatment of the wood fiber is carried out in a suitable tumbling mill so operated as to keep the contents in a constant state of agitation, as in a revolving barrel-like container. The material is handled in batches, each consisting at the outset of approximately 65% of the raw white pine or other normal resin wood, and 30% of highly resinous wood such as yellow or sugar pine, or the excess resinous portions of white pine.

When this fibrous mass has been thoroughly mixed, it is first treated by the addition of a quantity of a suitable synthetic resin, as for instance one of the phenol formaldehyde group, although I prefer to use a water soluble resin for this purpose and one prepared in accordance with Letters Patent No. 1,959,433, dated May 22, 1934. This particular resin, while having the general characteristics and properties of a phenol condensation product, is considerably cheaper, because it is derived from more plentiful sources of phenol such as creosol, and contains a substantial proportion of a carbohydrate, and while not as refined a product as so-called "bakelite" for example, is admirably suited for this purpose.

The resin is preferably incorporated in the fiber mass by spraying a considerably diluted solution into the tumbling mill, the advantage of the diluted solution being, first, to permit it to be sprayed more readily and, second, to have it spread over a greater area, and as far as possible cover each fiber with a very thin coating of the resin. The excess moisture in the solution has to be removed in order to keep the material as dry as possible and, therefore, the tumbling mill is preferably heated as by a steam jacket and vented so that the moisture can be eliminated as a vapor. The amount of synthetic resin thus added is approximately 5% by weight, this being ample to supplement the natural resin in the mixture and to give the correct proportion of each. At the same time a small amount of ordinary hydrated lime or calcium oxide is added to the fiber mass, the proportion being about ½ of 1% by weight. The function of the lime is to react with the natural resin in the wood to render it more stable and less likely to flow in the presence of heat. As is well known, natural resins are quite unstable, in that they have a low melting point and when the wood containing them is subjected to heat, the resin flows from it or comes to the surface as a sticky coating. Hence by hardening or fixing the natural resins in the fibers, they become stable against the effect of heat and also improve the water-resistant properties of the material.

Thus the proportions of ingredients entering into the material for the core 1 may be stated approximateely as follows:

| | Per cent |
|---|---|
| White pine or other non-resinous wood fiber | 64½ |
| Resinous wood fiber | 30 |
| Synthetic resin | 5 |
| Hydrated lime | ½ |

When the synthetic resin and the stabilizing or hardening agent have been thoroughly incorporated in the mixture of wood fiber, it is ready to be used in the process of making the finished product, and in its usable state is perfectly dry and the particles or fibers separated from each other as a more or less pulverized mass.

Now, the surface or outer layer material is prepared in practically the same way, except as already explained the fiber used is largely if not wholly derived from woods of a normal resin content. White pine is very satisfactory, although any light colored finely grained wood may also be used, as for example cottonwood, gum-wood, bass-wood and many of the hard woods. In this connection it may be stated that all of the so-called non-resinous woods do in fact contain resins, but in differing proportions, and since the presence of these natural resins is desired, any deficiency in the particular wood used can be corrected by the addition of a given amount of a highly resinous or pitchy fiber, care being taken to keep the proportion of the latter sufficiently low to avoid the creation of a sticky or gummy surface on the finished product, all of which can be readily ascertained after a little experience in the handling of different woods.

However, in using white pine as the non-resinous fiber base for the outer layers, the proportion by weight of the ingredients used is approximately stated as follows:

| | Per cent |
|---|---|
| White pine fiber | 70 |
| Synthetic resin | 15 |
| Hydrated lime | 5 |
| Sulphur | 10 |

It will thus be seen that with the exception of the sulphur, substantially the same ingredients are used for both the core and surface layers, although differing somewhat in proportion. Bearing in mind that the outer surfaces of the material are to be of a light uniform color and fine texture is primarily the reason for using a light colored wood, and the greater proportion of synthetic resin incorporated with it in order to obtain a correspondingly harder and water-resistant surface. The addition of sulphur to the mixture materially improves its quality in that it acts as a bleaching agent, thus tending to produce a uniformly light color finish, and furthermore increases somewhat the plasticity of the mixture, thus permitting it to flow more readily in the process of manufacture, whereby greater smoothness of surface finish is obtainable. Sulphur also has certain binding properties that make it a useful ingredient, and this fact suggests that it may be used in the preparation of the material for the core, except that it produces a rather diseagreeable odor when combined with certain kinds of pitch-laden woods. Otherwise it can be incorporated in the core, the increased plasticity thus derived being of an advantage where the material is to be shaped into forms other than flat sheets or boards.

Having prepared the mixtures from the normal and excess resin-containing woods according to the procedure just set forth, the process of producing the finished product in board or sheet form includes the following steps:

A form consisting of a flat highly polished metal plate and a removable frame surrounding the edges of the plate to a height several times the final thickness of the product, is preferably used for the initial assembling of the materials. A thin layer of the outer surface mixture is first spread over the surface of the plate, preferably by sifting the fibrous material through a screen, thus insuring a uniform thickness and the thorough disintegration of the particles. Over this layer is sifted the fibrous material for the core and to a depth to practically fill the form, and then another thin top layer of the outer surface mixture which is smoothed off by means of a striker bar to the level of the top of the form. A follower board is then placed on top of the superimposed layers, and the entire assembly is then placed in a hydraulic press and subjected to a pressure of about 500 pounds per square inch. This pressure is sufficient to consolidate the mass and partially compressing the fibers in the form of a mat of sufficient body to permit the removal of the side frame and follower board. Thus for a board which ultimately will be ⅛ of an inch in thickness, the initial depth of the loose fibrous material is, say, 2 inches, and after the initial pressure treatment, is reduced to perhaps ½ an inch.

The partially compressed mat is retained on the bottom plate, and another polished plate is placed on top of the mat and this assembly is then placed bodily in another or the same press, providing it is equipped with heating platens, that is, platens into which steam is introduced to maintain them at a relatively high temperature of, say, 340° F. The mat is now compressed between the heated platens at a considerably higher pressure of from 1000 to 1200 pounds per square inch, and for a period of about three (3) minutes after the pressure plates have once been heated. Upon completion of the compressing operation, the pressure plates are removed from the press, and after being allowed to cool for a short period, are separated and the finished material removed. However, with proper handling equipment, the product can be removed while the pressure plates are still hot, for the next pressing operation.

The finished product is exceedingly hard and dense, with thin, light surface layers and a somewhat darker central section or core. The surfaces of the product are perfectly smooth with a lustrous or glossy finish. Moreover, the product is entirely homogeneous in that there is no line of separation between the layers which, as heretofore pointed out, indicate color strata rather than any structural division. As a matter of fact, the product may be of the same color and texture throughout its entire thickness merely by using one grade of the prepared fibrous material. Thus for cheaper grades of product, the lighter colored finishing layers may be omitted entirely or made very thin. Manifestly, the thicker the finishing layers, the better the grade of the product, inasmuch as the fine uniformly light color and smooth grainless finish present a very superior surface, and one that is practically waterproof, due to a large extent to the somewhat greater proportions of synthetic resin in the surface layers. In fact, the product as a whole is highly water-resistant as witness the fact that the rate of absorption is only about 5% when immersed in water for 24 hours, as compared with upwardly of 15% in 4 or 5 hours for other known so-called composition or pressed wood or veneered products, even when subjected to a special waterproofing treatment.

In other respects, the product is superior to fabricated materials of the same general character. Its density is such as to have exceptionally high holding power of nails and screws and hence is admirably suited for general structural purposes such as exterior walls, concrete forms, boat building and the like. Moreover, it has unusual tensile strength, it being practically impossible to bend or break off a corner of a piece ⅛ inch thick with the pressure of the fingers. Again, the product although quite hard and dense, is easily worked with ordinary carpenter's tools and without unduly dulling their cutting edges, and is fireproof to a large degree in that it will not support combustion, although when subjected to a flame will in time be reduced to a charred state.

So much for the general characteristics of the product. For interior panel work, trim and doors, the material is especially desirable, inasmuch as it can be decorated in any desired manner. The addition of coloring matter to the outer finishing layers has already been mentioned, so that it can be used for table tops, automobile bodies and the like, or applied to a wall in panels. Moreover, the product in a light neutral color can be stained, varnished or otherwise decorated to harmonize with any desired color scheme, it only being necessary to rub down the surface lightly with sand paper in order to remove the gloss on the surface to render the material beneath sufficiently porous to absorb the stain.

And finally, being finished on both sides, it can be used for doors and door panels, and is practically moisture-proof and non-warping, this latter property being attributable in part to the thin surface layers on both sides acting as veneers to maintain the stresses uniform throughout the thickness of the material. Nor is its usefulness confined to flat surface coverings, inasmuch as it has ample plasticity in its heated state to assume curved and other irregular shapes, when pressed between dies. This does not mean that it can be moulded into intricate shapes and elaborate surface configurations, as for instance are obtainable by the use of ordinary moulding mixtures, but it can be shaped into lengths of interior trim of irregular cross section, or embossed with surface decorations to a limited extent, providing the design is not intricate.

Having thus set forth the nature, advantages and process of manufacturing the product herein, I claim as my invention:

1. A building material of the character described consisting of a compressed mixture of a finely divided woody substance containing a substantial quantity of natural resin, a relatively small amount of a synthetic resin and sufficient lime to react with the natural resin.

2. A building material of the character described consisting of compressed mixture of a finely divided woody substance of a substantial natural resin content, relatively small amounts of a synthetic resin and lime in the presence of heat sufficient to react the synthetic resin and effect the reaction of the lime and the natural resins present in the mixture.

3. A building material of the character described comprising a compressed mixture of finely divided relatively non-resinous and highly resinous woody substances in which is incorporated a relatively small quantity of a synthetic resin and a sufficient quantity of a suitable hardening agent to harden the natural resins.

4. A building material of the character described comprising a compressed mixture of substantially two-thirds (⅔) part of a relatively non-resinous woody substance and one-third (⅓) part of a highly resinous woody substance, both in finely divided states, substantially five per cent (5%) of a synthetic resin and a sufficient amount of a suitable hardening agent to react with the natural resins present in the mixture.

5. A building material of the character described comprising a compressed mixture of substantially sixty-five per cent (65%) of a non-resinous woody substance and thirty per cent (30%) of a highly resinous wood of the coniferous type reduced to a finely divided form, five per cent (5%) of a synthetic resin and one-half per cent (½%) of hydrated lime.

6. A building material of the character described comprising a compressed mixture of finely divided particles of a non-resinous wood and of a highly resinous wood of the coniferous type having relatively small proportions of a synthetic resin and hydrated lime to form the core of the material, and a surface layer composed of a similar mixture having substantially reduced percentage of highly resinous wood fiber and correspondingly increased percentage of the synthetic resin.

7. A building material of the character described comprising a core compressed mixture of substantially two-thirds (⅔) part of a non-resinous wood flour and one-third (⅓) part of a highly resinous wood of the coniferous type reduced to a finely divided state and having incorporated therein less than fifteen per cent (15%) of a synthetic resin and less than five per cent (5%) of hydrated lime, and a compressed surface layer composed of a similar mixture having substantially reduced percentage of highly resinous wood particles and correspondingly increased percentage of the synthetic resin.

8. A building material of the character described comprising a compressed mixture of substantially two-thirds (⅔) and one-third (⅓) parts each of a non-resinous wood and a highly resinous wood of the coniferous type, said woods being reduced to finely divided particles, in which is incorporated substantially five per cent (5%) of a synthetic resin and one-half per cent (½%) of hydrated lime to form the core of the finished material and a thin surface layer composed of a similar compressed mixture with the highly resinous wood fiber omitted, and the synthetic resin and lime contents proportionably increased.

9. A building material of the character described comprising a compressed core mixture of substantially sixty-five per cent (65%) of a non-resinous wood and thirty per cent (30%) of a highly resinous wood of the coniferous type, said woods being reduced to finely divided particles of a fibrous texture, five per cent (5%) of a synthetic resin and one-half per cent (½%) of hydrated lime and a surface layer composed of a similar compressed mixture with the highly resinous wood fiber omitted, the synthetic resin content proportionably increased, and substantially ten per cent (10%) of sulphur added.

10. A building material of the character described comprising a compressed mixture of substantially two parts to one part respectively of a so-called non-resinous wood and a highly resinous wood, both of the coniferous type, reduced to fine particles and further mixed with substantially five per cent (5%) of a synthetic resin of the water-soluble type and one-half per cent (½%) of hydrated lime, said product being coated on its outer surfaces with thin layers of a substantially lighter colored compressed mixture of non-resinous wood particles and substantially increased proportions of synthetic resin and hydrated lime, together with substantially ten per cent of sulphur.

11. A building material of the character described comprising a compressed core covered with thin lighter colored layers of a fine uniform texture, the mass of the material being composed of coniferous woods reduced to a finely divided state to which are added predetermined quantities of a synthetic resin and lime, the mixture for the core containing a relatively larger percentage of highly resinous wood and a lesser percentage of synthetic resin, plus sufficient hydrated lime to react with the natural resins in the highly resinous wood and the mixture for the outer layers containing little or no highly resinous wood but correspondingly increased amounts of synthetic resin and lime, together with a predetermined small amount of sulphur.

12. A composite material of the character described, consisting of a hard compressed mixture of wood particles, a substantial proportion thereof being excessively high in natural resins, and relatively small amounts of sulphur and lime.

13. A material of the character described, consisting of a compressed mixture of finely divided particles of a woody material having a relatively high natural resin content and a sufficient amount of a resin hardening agent to react with the natural resins.

14. A composite material of the character described, consisting of the resulting product of the compression to a hard dense mass of a mixture of excessively pitchy wood particles, a finely divided non-resinous woody material, and sufficient of a resin hardening agent to react with the natural resins present.

15. A composite material of the character described, consisting of the resulting product of the compression to a hard dense mass of a mixture of substantially two-thirds (⅔) part of wood particles of a normal resin content, one-third (⅓) part of wood particles of a highly resinous nature, and less than one per cent (1%) of lime.

16. A composite material of the character described, comprising a core composed of a mixture of finely divided wood particles of a relatively high resin content and a hardening agent in an amount sufficient to react with the natural resins present, and a surface layer composed of a mixture of finely divided wood particles of normal resin content and a relatively small amount of a synthetic resin.

17. A composite material of the character described, comprising a core composed of a mixture of finely divided wood particles of a relatively high resin content and a hardening agent in an amount sufficient to react with the natural resins present, and a surface layer composed of a mixture of finely divided wood particles of normal resin content and containing substantially fifteen per cent (15%) of synthetic resin.

18. A composite material of the character described, comprising a core composed of a mixture of finely divided wood particles of a relatively high natural resin content and a hardening agent in an amount sufficient to react with the natural resins present, and a surface coating mixture for said core composed of substantially seventy-five per cent (75%) of finely divided wood particles of a normal resin content, fifteen per cent (15%) of a synthetic resin and ten per cent (10%) of sulphur.

19. A building material of the character described, consisting of a compressed mixture of finely divided cellulosic substance containing little or no natural resins, a woody substance containing a substantial quantity of natural resin and relatively small amounts of synthetic resin and less than ten per cent (10%) of sulphur.

20. A building material of the character described, consisting of a compressed mixture of finely divided cellulosic substance containing little or no natural resin content, a relatively large amount of very resinous woody substance, and relatively small amounts of synthetic resin and lime.

21. A building material of the character described, consisting of a compressed mixture of finely divided cellulosic substance containing little or no natural resin, a relatively resinous woody substance and fifteen per cent (15%) or less of synthetic resin.

22. A building material of the character described, consisting of a compressed mixture of finely divided cellulosic substance having little or no natural resin content, a highly resinous woody substance, fifteen per cent (15%) or less of synthetic resin, and ten per cent (10%) or less of sulphur.

EMIL C. LOETSCHER.